United States Patent
Guidotti et al.

(10) Patent No.: US 10,584,192 B2
(45) Date of Patent: Mar. 10, 2020

(54) CATALYST COMPONENTS FOR THE POLYMERIZATION OF OLEFINS

(71) Applicant: BASELL POLIOLEFINE ITALIA S.R.L., Milan (IT)

(72) Inventors: Simona Guidotti, Ferrara (IT); Tiziano Dall'Occo, Ferrara (IT); Dario Liguori, Ferrara (IT); Giampiero Morini, Ferrara (IT)

(73) Assignee: Basell Poliolefine Italia S.r.l., Mlian (IT)

( * ) Notice: Subject to any disclaimer, the term of this patent is extended or adjusted under 35 U.S.C. 154(b) by 0 days.

(21) Appl. No.: 16/097,103

(22) PCT Filed: Apr. 24, 2017

(86) PCT No.: PCT/EP2017/059619
§ 371 (c)(1),
(2) Date: Oct. 26, 2018

(87) PCT Pub. No.: WO2017/186623
PCT Pub. Date: Nov. 2, 2017

(65) Prior Publication Data
US 2019/0338055 A1 Nov. 7, 2019

(30) Foreign Application Priority Data
Apr. 29, 2016 (EP) .................................. 16167608

(51) Int. Cl.
*C08F 10/02* (2006.01)
(52) U.S. Cl.
CPC .......... *C08F 10/02* (2013.01); *C08F 2410/01* (2013.01)

(58) Field of Classification Search
CPC ....................................................... C08F 10/02
See application file for complete search history.

(56) References Cited

U.S. PATENT DOCUMENTS

| 5,198,399 A | 3/1993 | Hoff et al. | |
|---|---|---|---|
| 5,424,263 A | 6/1995 | Buehler | |
| 2010/0160154 A1* | 6/2010 | Morini | C08F 10/00 502/115 |
| 2013/0158214 A1* | 6/2013 | Pater | C08F 10/00 526/110 |

FOREIGN PATENT DOCUMENTS

| WO | 2007147714 A1 | 12/2007 |
|---|---|---|
| WO | 2011076675 A1 | 6/2011 |

OTHER PUBLICATIONS

International Search Report and Written Opinion dated Aug. 8, 2017 (Aug. 8, 2017) for Corresponding PCT/EP2017/059619.

* cited by examiner

*Primary Examiner* — Catherine S Branch

(57) ABSTRACT

The present disclosure provides a solid catalyst component obtainable by a process including: (a) a first step in which $Ti(OEt)_4$, is reacted with a Mg based compound of formula $MgCl_n(OR^I)_{2-n}$, where n is from about 0.5 to about 1.5, $R^I$ is a $C_1$-$C_{10}$ alkyl groups, the $Ti(OEt)_4$ and the Mg compound are used in amounts such that the Ti/Mg molar ratio is of about 0.2 to about 0.4, the reaction temperature is about 110 to about 130° C., and the reaction time is about 2 to about 5 hours; and (b) a subsequent step in which the product obtained in step (a) is reacted with a Ti compound of the formula $Ti(OR^I)_{4-y}Cl_y$, where y is a number between 3 and 4.

14 Claims, No Drawings

CATALYST COMPONENTS FOR THE POLYMERIZATION OF OLEFINS

This application is the U.S. National Phase of PCT International Application PCT/EP2017/059619, filed Apr. 24, 2017, claiming benefit of priority to European Patent Application No. 16167608.5, filed Apr. 29, 2016, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a process for the preparation of catalyst components for the homopolymerization or copolymerization of olefins made from or containing Mg, Ti and halogen elements and optionally an electron donor compound.

BACKGROUND OF THE INVENTION

Ethylene polymers such as high density polyethylene (HDPE), linear low density polyethylene (LLDPE) and ultrahigh molecular weight polyethylene (UHMWPE) can be obtained by polymerizing ethylene, optionally in mixture with higher alpha olefins, in the presence of a coordination catalyst. One type of coordination catalyst is constituted by the Ziegler-Natta (ZN) catalyst. The polymerization processes can involve the use of a solid catalyst component made from or containing magnesium chloride based supports on which an active metal (such as titanium chloride) is fixed. In some instances, the resulting procatalyst is activated for polymerization by reacting the procatalyst with an organoaluminum compound.

In some instances, the procatalyst is produced according to different preparation routes, which impart specific characteristics to the procatalyst. In the ethylene polymerization field, a catalyst feature is polymerization activity. Additional catalyst features are the capability of the catalyst to produce ethylene polymers with high intrinsic viscosity (UHMWPE) and the capability of the catalyst to distribute the comonomer (higher alpha olefin) into the polyethylene chain for producing LLDPE.

SUMMARY OF THE INVENTION

The present disclosure provides a solid catalyst component for the homopolymerization or copolymerization of olefins $CH_2=CHR$, in which R is hydrogen or a hydrocarbyl radical with 1-12 carbon atoms, obtained by a process including:
(a) a first step in which $Ti(OEt)_4$, is reacted with a Mg based compound of formula $MgCl_n(OR^I)_{2-n}$, where n is from about 0.5 to about 1.5, $R^I$ is a $C_1$-$C_{10}$ alkyl groups, the $Ti(OEt)_4$ and the Mg compound are used in amounts such that the Ti/Mg molar ratio is of about 0.2 to about 0.4, the reaction temperature is about 110 to about 130° C., and the reaction time is about 2 to about 5 hours; and
(b) a subsequent step in which the product obtained in step (a) is reacted with a Ti compound of the formula $Ti(OR^I)_{4-y}Cl_y$, where y is a number between 3 and 4.

DETAILED DESCRIPTION OF THE INVENTION

In some embodiments, the value of n ranges from about 0.6 to about 1.4, alternatively from about 0.7 to about 1.3, alternatively from about 0.8 to about 1.2. In some embodiments, the Mg based compound is generated by an exchange reaction between organometallic compounds of the formula $Cl_mMgR^{III}_{2-m}$, where m is from 0 to about 1.5, and $R^{III}$ is a hydrocarbon group having from 1 to 20 carbon atoms, with an $OR^I$ group source. In some embodiments, the $OR^I$ sources are $R^I OH$ alcohols or a silicon compound of formula $(R^I O)_r SiR_{4-r}$, where r is from 1 to 4 and $R^I$ and R independently are $C_1$-$C_{10}$ alkyl group. In some embodiments, organometallic compounds of formula $Cl_mMgR^{III}_{2-m}$ are obtained by the reaction between Mg metal and an organic chloride $R^{III}Cl$, in which $R^{III}$ is as defined above, optionally in the presence of promoters. In some embodiments, the formation of $Cl_mMgR^{III}_{2-m}$ and the exchange with the $OR^I$ source take place in a single step. In some embodiments, the reaction is carried out in a liquid inert medium such as a hydrocarbon that is liquid at room temperature. In some embodiments, upon an amount of exchange with the $OR^I$ source, the catalyst precursors precipitate and is easily isolated.

In some embodiments, the reaction between the $Ti(OEt)_4$ and the Mg compound is carried out in an inert liquid medium selected among liquid hydrocarbons such as hexane, heptane and decane.

In some embodiments, $R^I$ is selected from $C_1$-$C_5$ linear or branched alkyl groups. In some embodiments, $R^I$ is selected from ethyl, isopropyl, n-butyl, i-butyl and t-butyl groups.

In some embodiments, at the end of step a), the resulting solid product is isolated filtration, centrifugation, or siphoning. Then, the resulting solid products is subjected to step (b).

In step (b), the reaction with the compound $Ti(OR^I)_{4-y}Cl_y$, takes place.

In some embodiments, the Ti compound is $TiCl_4$. In some embodiments, the Ti compound in step (b) is used in amounts with respect to the solid coming from step (a) to have a Ti/Mg ratio ranging from about 1 to about 100, alternatively from about 1 to about 70.

In some embodiments, liquid Ti compounds such as $TiCl_4$ are used. In those embodiments, the liquid Ti compounds are used in pure form, that is, not diluted with inert medium. In some embodiments, the amounts of liquid Ti compounds are small as compared to the solid coming from step (a) and the liquid Ti compounds are diluted with an inert medium.

In some embodiments, the titanium compound is used in total amounts with respect to the solid coming from step (a) to have a Ti/Mg ratio of about 15:1 or lower. In some embodiments, the titanium compound is $TiCl_4$. In some embodiments, the reaction temperature is from room temperature (about 25° C.) up to about 150° C., alternatively in the range of about 40 to about 120° C. In some embodiments, the reaction is carried out in an inert liquid at least at the reaction temperature. In some embodiments, the inert media are liquid aliphatic or aromatic hydrocarbons, optionally chlorinated, having from 3 to 20 carbon atoms. In some embodiments, the liquid hydrocarbons are propane, n-butane, n-pentane, n-hexane, n-heptane, decane, benzene, toluene and isomers thereof. In some embodiments, mixtures of two or more of these hydrocarbons are used.

In some embodiments, the titanium compound is used at a Ti:Mg molar ratio higher than about 15:1 and in a pure form. In some embodiments, the Ti compound is $TiCl_4$. In some embodiments, the reaction temperature is kept at values lower than about 80° C., alternatively in the range of about 20 to about 70° C., in combination with reaction times ranging from about 0.2 to about 1.5 hours. In some embodiments, the temperature is maintained at values higher than about 80° C., alternatively in the range of about 90 to about 130° C. In some embodiments, the reaction times are from about 1.5 to about 4 hours.

In some embodiments, at the end of the reaction with the Ti compound, the solid is washed with inert liquid hydrocarbons and then used in the preparation of the final catalyst.

In some embodiments, the solid catalyst component is subjected to a further step (c) which includes reacting with an internal electron donor compound (ID).

In some embodiments, the step (c) reaction is carried out under conditions such that the ID is added to the reaction mixture alone or in a mixture with other compounds in which the ID represents the main component in terms of molar amount. In some embodiments, the contact is carried out in a liquid medium such as a liquid hydrocarbon. In some embodiments, the amount of donor used is such that the ratio Mg/donor ranges from about 0.5 to about 3, alternatively from about 0.7 to about 1.5.

In some embodiments, the ID compound is selected from among alcohols, glycols, esters, ketones, amines, amides, nitriles, alkoxysilanes and ethers. In some embodiments, the ID compound is selected among cyclic ethers having 3-5 carbon atoms such as tetrahydrofuran, dioxane, and methyltetrahydrofuran. In some embodiments, the ID compound is tetrahydrofuran.

The temperature at which the contact takes place can vary depending on the nature of the reagents. In some embodiments, the temperature is in a range from about −10° C. to about 150° C., alternatively from about 0° C. to about 120° C. Temperatures causing the decomposition or degradation of any specific reagents should be avoided even if the temperatures fall within the range. In some embodiments, the time of the treatment depend on other conditions such as nature of the reagents, temperature, or concentration. In some embodiments, this contact step lasts from about 10 minutes to about 10 hours, alternatively from about 0.5 to about 5 hours. In some embodiments and to increase the final donor content, this step is repeated one or more times. At the end of this step the solid is recovered by separation of the suspension by settling and removing of the liquid, filtration, or centrifugation. In some embodiments, the solid is subjected to washings with solvents. In some embodiments, the washings are carried out with inert hydrocarbon liquids. In some embodiments, the washings use more polar solvents such as halogenated or oxygenated hydrocarbons. In some embodiments, the polar solvents have a higher dielectric constant.

In some embodiments, when step (c) is carried out, the solid product recovered from step (c) is subjected to a further step (d), including a thermal treatment carried out at temperatures ranging from about 70° C. to about 150° C., alternatively from about 80° C. to about 130° C., alternatively from about 85° C. to about 100° C.

In some embodiments, the solid coming from step (c) is suspended in an inert diluent like a hydrocarbon and then subjected to heating while maintaining the system under stirring.

In some embodiments, the solid is heated in a dry state by inserting the solid in a device having jacketed heated walls. In some embodiments, stirring is provided by mechanical stirrers placed within the device. In some embodiments, stirring takes place by using rotating devices.

In some embodiments, the solid coming from step (c) is heated by a flow of hot inert gas such as nitrogen. In some embodiments, heating includes maintaining the solid under fluidization conditions.

In some embodiments, the heating time is not fixed and varies depending on the other conditions such as the maximum temperature reached. In some embodiments, the heating time ranges from about 0.1 to about 10 hours, alternatively from about 0.5 to about 6 hours. In some embodiments, higher temperatures allow the heating time to be shorter while lower temperatures involve longer reaction times.

In some embodiments, the process described in step (d) is carried out immediately after the previous step, without the need of isolating the solid product coming from that previous step. In some embodiments, the solid product coming from the previous step is isolated and washed before being subjected to the subsequent step.

In some embodiments, the solid catalyst component has an average particle size ranging from about 5 to about 120 μm, alternatively from about 10 to about 100 μm.

In some embodiments, the solid catalyst component is converted into catalyst for the polymerization of olefins by reacting it with alkyl-Al compounds.

In some embodiments, the alkyl-Al compound is chosen among the trialkyl aluminum compounds. In some embodiments, the trialkyl aluminum compounds is selected from the group consisting of triethylaluminum, triisobutylaluminum, tri-n-butylaluminum, tri-n-hexylaluminum, and tri-n-octylaluminum. In some embodiments, the alkyl-Al compound is chosen among alkylaluminum halides, alkylaluminum hydrides or alkylaluminum sesquichlorides. In some embodiments, the alkylaluminum sesquichlorides is selected from the group consisting of $AlEt_2Cl$ (diethyl aluminum chloride) and $Al_2Et_3Cl_3$. In some embodiments, the alkyl-Al compound is a mixture. In some embodiments, the alkyl-Al compound is a mixture of aluminum triethyl and diethylaluminum chloride.

In some embodiments, the Al/Ti ratio is higher than about 1, alternatively between about 50 and about 2000.

In some embodiments, an external electron-donor (ED) compound(s) is used. In some embodiments, the external electron-donor (ED) compound is selected from silicon compounds, ethers, esters, amines, heterocyclic compounds, and ketones. In some embodiments, the external electron-donor (ED) compound is 2,2,6,6-tetramethylpiperidine.

In some embodiments, the catalyst is used in a process for the homopolymerization or copolymerization of olefins $CH_2=CHR$, in which R is hydrogen or a hydrocarbyl radical with 1-12 carbon atoms.

In some embodiments, the catalyst is used to prepare very-low-density and ultra-low-density polyethylene (VLDPE and ULDPE, having densities lower than about 0.920 $g/cm^3$, including values down to about 0.880 $g/cm^3$) made from or containing copolymers of ethylene with one or more alpha-olefins having from 3 to 12 carbon atoms, having a mole content of units derived from ethylene of higher than about 80%; and high density ethylene polymers (HDPE, having a density higher than about 0.940 $g/cm^3$), made from or containing ethylene homopolymers and copolymers of ethylene with alpha-olefins having 3-12 carbon atoms and UHMWPE characterized by an intrinsic viscosity [η] in tetraline at 135° C. of higher than about 10.

In some embodiments, the polymerization process is a slurry polymerization using as a diluent an inert hydrocarbon solvent, or a bulk polymerization using a liquid monomer as a reaction medium. In some embodiments, the liquid monomer is propylene. In some embodiments, the polymerization process is a gas-phase polymerization operating in one or more fluidized or mechanically agitated bed reactors. In some embodiments, the slurry polymerization involves an inert medium such as propane, butane, pentane, hexane, heptane and mixtures thereof. The polymerization process yields a polymer selected from the group consisting of VLDPE, ULDPE, HDPE, and UHMWPE. In some embodiments, the polymer is UHMWPE.

The following examples are given in order to better illustrate the disclosure without limiting it.

EXAMPLES

Characterizations

Determination of Mg, Ti

The determination of Mg and Ti content in the solid catalyst component was carried out via inductively coupled plasma emission spectroscopy on "I.C.P Spectrometer ARL Accuris".

The sample was prepared by analytically weighting, in a "Fluxy" platinum crucible," 0.1-0.3 grams of catalyst and 2 grams of lithium metaborate/tetraborate in a 1/1 mixture. After the addition of some drops of potassium iodide (KI) solution, the crucible was inserted in a "Claisse Fluxy" for complete burning. The residue was collected with a 5% v/v $HNO_3$ solution and then analyzed via ICP at the following wavelengths: magnesium: 279.08 nm; titanium: 368.52 nm.

Determination of Cl

The determination of Cl content in the solid catalyst component was carried out by potentiometric titration with silver nitrate. In a 250 mL beaker the contents were subsequently charged with 5 mL of a sodium hydroxide solution (10% wt./vol. in water) and 0.1-0.3 grams of catalyst. After 20 min of stirring at room temperature, 40 mL of a 3.6 M nitric acid solution in water were added and stirring was continued for additional 10 min. After dilution with 100 mL of demineralized water, the titration started with a 0.1 N $AgNO_3$ solution in water. As soon as the point of equivalence was found, the amount of titrant used was calculated and the amount of chlorine present in the catalyst quantified.

Determination of Internal Donor Content (THF, EtOH)

The determination of the content of internal donor in the solid catalytic compound was done through gas chromatography. The solid component was dissolved in acetone, an internal standard was added, and a sample of the organic phase was analyzed in a gas chromatograph to determine the amount of donor present in the starting catalyst compound.

Determination of Melt Index (MIE, MIF, MIP)

The melt indices were measured at 190° C. according to ASTM D-1238, condition "E" (load of 2.16 kg), "P" (load of 5.0 kg) and "F" (load of 21.6 kg).

The ratio between MIF and MIE is indicated as F/E, while the ratio between MIF and MIP is indicated as F/P.

Determination of Intrinsic Viscosity

A weighed amount of the sample was dissolved in tetrahydronaphthalene (THN) at a constant temperature of 135° C. The flow time of the diluted solution was determined with a Sematech Cinevisco system equipped with an Ubbelohde modified capillary viscometer, which was thermostated at 135° C. Irganox 1010 was added as an antioxidant to minimize degradation of the molecular weight. The IV calculations were performed using the Huggins' equation and assuming a Huggins' coefficient equal to 0.35. The flow times of solvents and solutions were corrected by taking into account the contributions due to the kinetic energy. The solution concentrations were evaluated by taking into account the change of THN volumes from room temperature to 135° C.

Determination of Comonomer Content 1-butene was determined via infrared (IR) spectrometry.

Determination of Fraction Soluble in Xilene 2.5 g of polymer and 250 ml of o-xylene were placed in a round-bottomed flask equipped with a cooler and a reflux condenser and kept under nitrogen. The resulting mixture was heated to 135° C. and then kept under stirring for about 60 minutes. The final solution was allowed to cool to 25° C. under continuous stirring, and the insoluble polymer was then filtered. The filtrate was then evaporated in a nitrogen flow at 140° C. to reach a constant weight. The content of the xylene-soluble fraction is expressed as a percentage of the original 2.5 grams.

Determination of Effective Density

The polymer density was measured according to method ASTM-D 1505. This test method observes the level to which a test specimen sinks in a liquid column exhibiting a density gradient.

Procedure for the Preparation of the Solid Catalyst Precursor

Into a 1000 ml round bottom flask, equipped with breakwaters, a mechanical stirrer, a cooler and a thermometer, 600 ml of n-decane and 42.3 g of the magnesium compound $MgClOC_2H_5$ were sequentially introduced at room temperature under nitrogen atmosphere. While stirring, titanium (IV) ethoxide was added dropwise in an amount to produce a Ti/Mg molar ratio of 0.3. The whole mixture was heated to 120° C. and kept under stirring at this temperature for 3 hours. Thereafter, stirring was stopped, the solid product was allowed to settle, and the supernatant liquid was siphoned off. The solid was washed two times with anhydrous heptane at 90° C., then with anhydrous hexane in a temperature gradient down to 60° C., and one time at room temperature. The resulting solid was then dried under vacuum and analyzed. The solid showed the following characteristics:

Ti: 7.5% (by weight)

Mg: 13.7% (by weight)

EtOH: 53.1% (by weight)

Therefore, the Ti/Mg molar ratio in this adduct was 0.28 and the EtOH/Mg molar ratio was 2.03. The particle size distribution (SPAN) of the support was found to be 1.1. The amount of Ti bonded in the precursor with respect to the fed initial amount used was 92.5% wt. The amount of Mg bonded compound with respect to the fed initial amount used was more than 90%.

Comparative Procedure for the Preparation of the Solid Catalyst Precursor

The preparation was carried out as described above with the difference that the temperature was kept at 90° C. instead of 120° C. The amount of Ti bonded in the precursor with respect to the fed initial amount used was 47.2% wt.

Procedure for the Preparation of the Solid Catalyst Component A

Into a 500 ml round bottom flask, equipped with mechanical stirrer, cooler and thermometer, 220 ml of $TiCl_4$ were introduced at room temperature under nitrogen atmosphere. After cooling to 0° C., 15.3 g of the solid catalyst precursor was added into the flask. The temperature was raised to 50° C. and maintained for 0.5 hour. Thereafter, stirring was stopped, the solid product was allowed to settle, and the supernatant liquid was siphoned off at 50° C. After the supernatant was removed, additional fresh $TiCl_4$ was added to reach the initial liquid volume again. The mixture was then heated to 50° C. and kept at this temperature for 0.5 hour. Stirring was stopped again, the solid was allowed to settle, and the supernatant liquid was siphoned off. The solid was washed three times with anhydrous heptane at 50° C., then with anhydrous hexane in temperature gradient down to 50° C. and one time at room temperature. The resulting solid was then dried under vacuum and analyzed. The solid showed the following characteristics:

Ti 9.8% (by weight)
Mg 12.7% (by weight)
EtOH 12.2% (by weight)

Therefore, the Mg/Ti molar ratio in this solid catalyst component was 2.56 and the EtOH/Ti molar ratio was 1.29.

Procedure for the Preparation of the Solid Catalyst Component B

Into a 500 ml round bottom flask, equipped with a mechanical stirrer, a cooler and a thermometer, 215 ml of $TiCl_4$ were introduced at room temperature under nitrogen atmosphere. After cooling to 0° C., 15.0 g of the solid catalyst precursor was added into the flask. The temperature was raised to 100° C. and maintained for 1.0 hour. Thereafter, stirring was stopped, the solid product was allowed to settle, and the supernatant liquid was siphoned off at 100° C. After the supernatant was removed, additional fresh $TiCl_4$ was added to reach the initial liquid volume again. The mixture was then heated to 130° C. and kept at this temperature for 0.5 hour. Stirring was stopped again, the solid was allowed to settle, and the supernatant liquid was siphoned off at 130° C. After the supernatant was removed, additional fresh $TiCl_4$ was added to reach the initial liquid volume again. The mixture was then heated to 130° C. and kept at this temperature for 0.5 hour. Stirring was stopped again, the solid was allowed to settle and the supernatant liquid was siphoned off. The solid was washed three times with anhydrous heptane at 90° C., then with anhydrous hexane in a temperature gradient down to 60° C. and one time at room temperature. The resulting solid was then dried under vacuum and analyzed. The solid showed the following characteristics:

Ti: 6.8% (by weight)
Mg: 17.3% (by weight)
EtOH: 4.1% (by weight)

Therefore, the Mg/Ti molar ratio in this solid catalyst component was 5.02 and the EtOH/Ti molar ratio was 0.63.

Procedure for the Preparation of the Solid Catalyst Component C

Into a 500 ml round bottom flask, equipped with a mechanical stirrer, a cooler and a thermometer, 225 ml of anhydrous heptane and 15.8 g of the solid catalyst precursor were sequentially introduced at room temperature under nitrogen atmosphere. While stirring, titanium (IV) chloride was added dropwise in an amount such to meet a Ti/Mg molar ratio of 4.1. The whole mixture was heated to 85° C. and kept under stirring at this temperature for 1.0 hour. Thereafter, stirring was stopped, the solid product was allowed to settle, and the supernatant liquid was siphoned off at 85° C. After the supernatant was removed, an additional 225 ml of fresh anhydrous heptane were added. Subsequently, $TiCl_4$ was added dropwise in an amount to produce a Ti/Mg molar ratio of 4:1. The mixture was then heated to 95° C. and kept at this temperature for 1.0 hour. Stirring was stopped again, the solid was allowed to settle, and the supernatant liquid was siphoned off. The solid was washed three times with anhydrous heptane at 90° C., then one time with anhydrous hexane at 55° C. and one time at room temperature. The resulting solid was then dried under vacuum and analyzed. The solid showed the following characteristics:

Ti: 10.9% (by weight)
Mg: 13.7% (by weight)
EtOH: 9.5% (by weight)

Therefore, the Mg/Ti molar ratio in this solid catalyst component was 2.47 and the EtOH/Ti molar ratio was 0.91.

Procedure for the Preparation of the Solid Catalyst Component D

Into a 250 ml round bottom flask, equipped with mechanical stirrer, cooler and thermometer 95 ml of heptane and 3.7 g of solid catalyst component B were sequentially introduced at room temperature under nitrogen atmosphere. The temperature was then raised to 50° C. and under stirring tetrahydrofuran (THF) was added dropwise in an amount to produce a molar ratio of Mg:THF of 1:15. The reaction mixture was stirred at 50° C. for 2.0 hours. The stirring was discontinued, the solid product was allowed to settle, and the supernatant liquid was siphoned off. The solid was washed once with anhydrous heptane at 50° C. After decantation, the supernatant liquid was removed, and additional fresh heptane was added to reach the initial liquid volume again. The mixture was then heated to 95° C. and kept at this temperature for 2.0 hours. Stirring was stopped again, the solid was allowed to settle, and the supernatant liquid was siphoned off. The solid was washed twice with anhydrous heptane at 60° C., then once with anhydrous hexane at room temperature and finally dried under vacuum and analyzed. The solid showed the following characteristics:

Ti: 3.2% (by weight)
Mg: 14.7% (by weight)
THF: 22.3% (by weight)
EtOH: 2.6% (by weight)

Therefore, the Mg:Ti molar ratio in this solid catalyst component was 9.09 and the THF:Ti molar ratio was 4.63.

Procedure for the Preparation of the Solid Catalyst Component E (Comparative)

The solid catalyst component E was prepared by applying the procedure described above for the synthesis of the solid catalyst component A, but using $MgClOC_2H_5$ as a solid catalyst precursor. The solid showed the following characteristics:

Ti: 7.5% (by weight)
Mg: 14.7% (by weight)
EtOH: 17.1% (by weight)

Therefore, the Mg:Ti molar ratio in this solid catalyst component was 3.86 and the EtOH:Ti molar ratio was 2.37.

Procedure for the Preparation of the Solid Catalyst Component F (Comparative)

The solid catalyst component F was prepared by applying the procedure described above for the synthesis of the solid catalyst component B, but using $MgClOC_2H_5$ as a solid catalyst precursor. The resulting solid was then dried under vacuum and analyzed. The solid showed the following characteristics:

Ti: 5.1% (by weight)
Mg: 18.4% (by weight)
EtOH: 4.4% (by weight)

Therefore, the Mg:Ti molar ratio in this solid catalyst component was 7.09 and the EtOH:Ti molar ratio was 0.88.

Procedure for the Preparation of the Solid Catalyst Component G (Comparative)

The solid catalyst component G was prepared by applying the procedure described above for the synthesis of the solid catalyst component C, but using $MgClOC_2H_5$ as a solid catalyst precursor. The resulting solid was then dried under vacuum and analyzed. The solid showed the following characteristics:

Ti: 8.0% (by weight)
Mg: 16.0% (by weight)
EtOH: 13.5% (by weight)

Therefore, the Mg:Ti molar ratio in this solid catalyst component was 3.97 and the EtOH:Ti molar ratio was 1.76.

General Procedure for the HDPE Polymerization Test

A 4.5-liter stainless-steel autoclave equipped with a magnetic stirrer, temperature and pressure indicator, and a feeding line for hexane, ethylene, and hydrogen, was used and purified by fluxing pure nitrogen at 70° C. for 60 minutes. Then, a solution of 1550 cm$^3$ of hexane containing 0.25 g of triethyl aluminum (TEA) and 0.125 g of diethyl aluminum chloride (DEAC) was introduced at a temperature of 30° C. under nitrogen flow. In a separate 100 cm$^3$ round bottom glass flask were subsequently introduced 50 cm$^3$ of anhydrous hexane, 0.25 g of triethyl aluminum (TEA), 0.125 g of diethyl aluminum chloride (DEAC) and 0.005-0.010 grams of the solid catalyst component. The components were mixed together, aged 10 minutes at room temperature and introduced under nitrogen flow into the reactor. The autoclave was closed, the temperature was raised to 75° C., and hydrogen (4 bars partial pressure) and ethylene (7.0 bars partial pressure) were added. Under continuous stirring, the total pressure was maintained at 75° C. for 120 minutes by feeding ethylene. At the end of the polymerization, the reactor was depressurized, and the temperature was reduced to 30° C. The recovered polymer was dried at 40° C. under vacuum and analyzed.

General Procedure for the UHMWPE Polymerization Test

A 4.5-liter stainless steel autoclave equipped with a magnetic stirrer, temperature and pressure indicator, and a feeding line for hexane, ethylene, and hydrogen, was used and purified by fluxing pure nitrogen at 70° C. for 60 minutes. Then, a solution of 1550 cm$^3$ of hexane containing 0.2 g of triethyl aluminum (TEA) was introduced at a temperature of 30° C. under nitrogen flow. In a separate 100 cm$^3$ round bottom glass flask were subsequently introduced 50 cm$^3$ of anhydrous hexane, 0.20 g of triethyl aluminum (TEA), optionally 0.35 mmol of dicyclopentyldimethoxysilane, D donor as an external donor (Al/D=10 m.r.) and 0.005-0.010 grams of the solid catalyst component. The components were mixed together, aged 10 minutes at room temperature and introduced under nitrogen flow into the reactor. The autoclave was closed, then the temperature was raised to 75° C. and ethylene (7.0 bars partial pressure) was added. Under continuous stirring, the total pressure was maintained at 75° C. for 120 minutes by feeding ethylene. At the end of the polymerization, the reactor was depressurized, and the temperature was dropped to 30° C. The recovered polymer was dried at 40° C. under vacuum and analyzed.

General Procedure for the LLDPE Polymerization Test in Slurry

A 4.5 liter stainless-steel autoclave equipped with a magnetic stirrer, temperature, pressure indicator, and feeding line for ethylene, propane, 1-butene, and hydrogen, and a steel vial for the injection of the catalyst, was purified by fluxing pure nitrogen at 70° C. for 60 minutes. The autoclave was then washed with propane, heated to 75° C. and finally loaded with 800 g of propane, 200 g of 1-butene, ethylene (7.0 bar, partial pressure) and hydrogen (1.5 bar, partial pressure). In a separate 100 cm$^3$ round bottom glass flask were subsequently introduced, 50 cm$^3$ of anhydrous hexane, the cocatalyst mixture solution composed by triethyl aluminum/diethyl aluminum chloride, TEA/DEAC 2/1 weight ratio (8.5 mmol of aluminum), 0.12 g of tetrahydrofuran as external donor (Al/THF=5 m.r.), and 0.120 grams of the solid catalyst component (D). They were mixed together and stirred at room temperature for 10 minutes and then introduced in the reactor through the steel vial by using a nitrogen overpressure. Under continuous stirring, the total pressure was maintained constant at a constant 75° C. for 110 minutes by feeding ethylene into the system (150 g of ethylene were absorbed). At the end the polymerization, the reactor was depressurized, and the temperature was reduced to 30° C. The recovered polymer was dried at 70° C. under a nitrogen flow and weighted.

General Procedure for the LLDPE Polymerization Test in Gas-phase

The polymerization test was carried out in a 15.0 liter stainless-steel fluidized reactor, equipped with a gas-circulation system, a cyclone separator, a thermal exchanger, a temperature and pressure indicator, a feeding line for ethylene, propane, 1-butene, and hydrogen, and with a 1 liter steel reactor for the catalyst pre-polymerization, injection of the catalytic system into the fluidized bed reactor, or both. The gas-phase of the reactor is recycled with such a velocity that the polymeric bed in the reactor is kept in fluidized conditions. The reactor was heated to 86° C. and loaded with propane (61% mol), 1-butene (9% mol), ethylene (25% mol) and hydrogen (5% mol). In a separate 100 cm$^3$ round bottom glass flask were subsequently introduced 45 cm$^3$ of anhydrous hexane, 0.025 g of trihexyl aluminum (THA), 0.019 g of diethyl aluminum chloride (DEAC) and 0.070-0.150 grams of the solid catalyst component. The components were mixed together and stirred at 40° C. for 60 minutes and then introduced in the 1 liter reactor under a propane flow. The activated catalyst was injected into the gas-phase reactor by using a propane flow (150 g) and 0.15 g of triethyl aluminum (TEAL). The final pressure was about 21 bar and kept constant during the polymerization at 86° C. for 90 minutes by feeding a 9% wt. 1-butene/91% wt. ethylene mixture. At the end of the polymerization, the reactor was depressurized, and the temperature was dropped to 30° C. The collected polymer was dried at 70° C. under a nitrogen flow and weighed.

Examples 1-2 and Comparative Examples C1-C2

The solid catalyst components A, B, E and F were used for HDPE polymerization tests. Both polymerization performance and characterization are reported in Table 1.

TABLE 1

| | HDPE polymerizations | | | |
|---|---|---|---|---|
| | Catalyst Component Type | Mileage kg/g | MIE g/10' | F/E | F/P |
| Ex. 1 | A | 86 | 1.3 | 34.9 | 11.8 |
| Ex. 2 | B | 24 | 0.5 | 36.7 | 11.3 |
| C1 | E | 53 | 3.0 | 31.1 | 10.6 |
| C2 | F | 16 | 1.2 | 35.7 | 11.0 |

Examples 3-8 and Comparative Examples C3-C8

The solid catalyst components A, B, C, E, F and G were used for UHMWPE polymerization tests, optionally using the external donor dicyclopentyldimethoxysilane D. Both polymerization performance and characterization are reported in Table 2.

TABLE 2

UHMWPE polymerizations

| | Catalyst Component Type | Cocatalyst Type | Mileage kg/g | η dL/g |
|---|---|---|---|---|
| Ex. 3 | A | TEA/no ED | 124 | 9.8 |
| Ex. 4 | | TEA/D | 65 | 15.3 |
| Ex. 5 | B | TEA/no ED | 59 | 13.5 |
| Ex. 6 | | TEA/D | 77 | 22.6 |
| Ex. 7 | C | TEA/no ED | 140 | 9.5 |
| Ex. 8 | | TEA/D | 67 | 15.7 |
| C3 | E | TEA/no ED | 19 | 10.7 |
| C4 | | TEA/D | 35 | 15.7 |
| C5 | F | TEA/no ED | 25 | 9.7 |
| C6 | | TEA/D | 30 | 18.6 |
| C7 | G | TEA/no ED | 56 | 8.5 |
| C8 | | TEA/D | 30 | 21.0 |

Example 9

The solid catalyst component A was tested in slurry LLDPE polymerization. The polymerization performance and characterization are reported in Table 3.

TABLE 3 slurry LLDPE polymerizations

| | Catalyst Component Type | Mileage Kg/g/h | MIE g/10' | F/E | C4 % wt. | XS % wt. | Density g/cc |
|---|---|---|---|---|---|---|---|
| Ex. 9 | A | 19 | 1.1 | 32.1 | 10.1 | 9.6 | 0.9229 |

Example 10

The solid catalyst component D was tested in gas phase LLDPE polymerization. The polymerization performance and characterization are reported in Table 4.

TABLE 4 gas phase LLDPE polymerization

| | Catalyst Component Type | Mileage Kg/g | MIE g/10' | F/E | C4 % wt. | XS % wt. | Density g/cc |
|---|---|---|---|---|---|---|---|
| Ex. 10 | D | 6.5 | 0.9 | 25.7 | 8.3 | 5.0 | 0.9214 |

What is claimed is:

1. A solid catalyst component for the homopolymerization or copolymerization of olefins $CH_2=CHR$, in which R is hydrogen or a hydrocarbyl radical with 1-12 carbon atoms, obtained by a process comprising:
  (a) a first step in which $Ti(OEt)_4$ is reacted with a Mg based compound of formula $MgCl_n(OR^I)_{2-n}$, where n is from 0.5 to 1.5, $R^I$ is a $C_1$-$C_{10}$ alkyl groups, the $Ti(OEt)_4$ and the Mg compound are used in amounts such that the Ti/Mg molar ratio is of 0.2 to 0.4, the reaction temperature is 110 to 130° C. and the reaction time is 2 to 5 hours; and
  (b) a subsequent step in which the product obtained in step (a) is reacted with a Ti compound of formula $Ti(OR^I)_{4-y}Cl_y$, where y is a number between 3 and 4.

2. The solid catalyst component of claim 1, wherein the value of n ranges from 0.6 to 1.4.

3. The solid catalyst component of claim 1, wherein $R^I$ is selected from ethyl, isopropyl, n-butyl, i-butyl and t-butyl groups.

4. The solid catalyst component of claim 1, wherein in step (b) the Ti compound is $TiCl_4$.

5. The solid catalyst component of claim 1, wherein the Ti compound in step (b) is used in an amount with respect to the solid coming from step (a) to have a Ti/Mg molar ratio ranging from 1 to 100.

6. The solid catalyst component of claim 5, wherein the titanium compound is used in total amounts with respect to the solid coming from step (a) to have a Ti/Mg molar ratio of 15:1 or lower.

7. The solid catalyst component of claim 5, wherein the titanium compound is used in total amounts with respect to the solid coming from step (a) to have a Ti/Mg molar ratio higher than 15:1 and in a pure form at a reaction temperature of lower than 80° C.

8. The solid catalyst component of claim 7, wherein the reaction time ranges from 0.2 to 1.5 hours.

9. The solid catalyst component of claim 5, wherein the titanium compound is used in total amounts with respect to the solid coming from step (a) to have a Ti/Mg molar ratio higher than 15:1 and in a pure form at a reaction temperature of higher than 80° C. in combination with reaction times of 1.5 to 4 hours.

10. The solid catalyst component of claim 1, wherein the process further comprises step (c) reacting with an internal electron donor compound (ID).

11. The solid catalyst component of claim 10, wherein the ID is selected from alcohols, glycols, esters, ketones, amines, amides, nitriles, alkoxysilanes and ethers.

12. The solid catalyst component of claim 10, wherein the ID is tetrahydrofuran.

13. A catalyst for the polymerization of homopolymerization or copolymerization of olefins $CH_2=CHR$, in which R is hydrogen or a hydrocarbyl radical with 1-12 carbon atoms, yielding a polymer, comprising:
  the product obtained by contacting
  (A) a solid catalyst component obtained by a process including the steps of
    (a) a first step in which $Ti(OEt)_4$ is reacted with a Mg based compound of formula $MgCl_n(OR^I)_{2-n}$, where n is from about 0.5 to about 1.5, $R^I$ is a $C_1$-$C_{10}$ alkyl groups, the $Ti(OEt)_4$ and the Mg compound are used in amounts such that the Ti/Mg molar ratio is of about 0.2 to about 0.4, the reaction temperature is about 110 to about 130° C. and the reaction time is about 2 to about 5 hours; and
    (b) a subsequent step in which the product obtained in step (a) is reacted with a Ti compound of formula $Ti(OR^I)_{4-y}Cl_y$, where y is a number between 3 and 4
  with
  (B) an alkyl-Al compound.

14. A process for the polymerization of homopolymerization or copolymerization of olefins, $CH_2=CHR$, in which R is hydrogen or a hydrocarbyl radical with 1-12 carbon atoms, the process comprising the step of:
  polymerizing the olefins in the presence of a catalyst obtained by contacting
  (A) a solid catalyst component obtained by a process including the steps of
    (a) a first step in which $Ti(OEt)_4$ is reacted with a Mg based compound of formula $MgCl_n(OR^I)_{2-n}$, where n is from about 0.5 to about 1.5, $R^I$ is a $C_1$-$C_{10}$ alkyl groups, the Ti(OEt)$_4$ and the Mg compound are used in amounts such that the Ti/Mg molar ratio is of about 0.2 to about 0.4, the reaction temperature is about 110 to about 130° C. and the reaction time is about 2 to about 5 hours; and (b) a subsequent step in which the product obtained in step (a) is reacted with a Ti compound of formula Ti(OR$^I$)$_{4-y}$Cl$_y$, where y is a number between 3 and 4 with (B) an alkyl-Al compound.

* * * * *

UNITED STATES PATENT AND TRADEMARK OFFICE
CERTIFICATE OF CORRECTION

PATENT NO. : 10,584,192 B2
APPLICATION NO. : 16/097103
DATED : March 10, 2020
INVENTOR(S) : Guidotti et al.

Page 1 of 1

It is certified that error appears in the above-identified patent and that said Letters Patent is hereby corrected as shown below:

On the Title Page

Column 1, Item (30), Line 1, delete "16167608" and insert -- 16167608.5 --, therefor Signed and Sealed this
Eighth Day of November, 2022

Katherine Kelly Vidal
*Director of the United States Patent and Trademark Office*